(12) United States Patent
Propheter-Hinckley et al.

(10) Patent No.: US 10,173,264 B2
(45) Date of Patent: Jan. 8, 2019

(54) ADDITIVE MANUFACTURING BAFFLES, COVERS, AND DIES

(71) Applicant: United Technologies Corporation, Hartford, CT (US)

(72) Inventors: Tracy A. Propheter-Hinckley, Manchester, CT (US); Brandon S. Donnell, Hartford, CT (US)

(73) Assignee: United Technologies Corporation, Farmington, CT (US)

( * ) Notice: Subject to any disclaimer, the term of this patent is extended or adjusted under 35 U.S.C. 154(b) by 419 days.

(21) Appl. No.: 14/774,882

(22) PCT Filed: Mar. 11, 2014

(86) PCT No.: PCT/US2014/023062
§ 371 (c)(1),
(2) Date: Sep. 11, 2015

(87) PCT Pub. No.: WO2014/150365
PCT Pub. Date: Sep. 25, 2014

(65) Prior Publication Data
US 2016/0023275 A1 Jan. 28, 2016

Related U.S. Application Data

(60) Provisional application No. 61/787,467, filed on Mar. 15, 2013.

(51) Int. Cl.
*B22F 5/00* (2006.01)
*F01D 5/18* (2006.01)
(Continued)

(52) U.S. Cl.
CPC ............ *B22F 5/009* (2013.01); *B22F 3/1055* (2013.01); *B33Y 10/00* (2014.12); *B33Y 30/00* (2014.12);
(Continued)

(58) Field of Classification Search
CPC ................... B22F 5/009; B22F 3/1055; B22F 2003/1056; B22F 5/04; F01D 5/1475;
(Continued)

(56) References Cited

U.S. PATENT DOCUMENTS 4,369,016 A * 1/1983 Dennison ................ F01D 9/065
415/142
4,863,538 A 9/1989 Deckard
(Continued)

FOREIGN PATENT DOCUMENTS

CN 101903124 A 12/2010
CN 102029389 A 4/2011
(Continued)

OTHER PUBLICATIONS

Second Chinese Office Action, for Chinese Patent Application No. 201480016069.1, dated Feb. 4, 2017, 26 pages.
(Continued)

*Primary Examiner* — Dwayne J White
*Assistant Examiner* — Adam W Brown
(74) *Attorney, Agent, or Firm* — Kinney & Lange, P.A.

(57) ABSTRACT

A method includes (a) depositing a layer of a powder material on a work stage, the layer having a thickness, (b) solidifying a portion of the layer based upon data that defines an insert with a body that is shaped to fit into a cavity in a gas turbine engine component, and (c) lowering the work stage by the thickness. Steps (a)-(c) can then be repeated until the insert is complete. The insert can then be removed from the work stage. An insert formed by the above process is also disclosed.

12 Claims, 4 Drawing Sheets

(51) Int. Cl.
*B22F 3/105* (2006.01)
*B33Y 10/00* (2015.01)
*B33Y 30/00* (2015.01)
*F01D 5/14* (2006.01)
*B22F 5/04* (2006.01)
*F01D 9/04* (2006.01)
*F01D 9/06* (2006.01)
*B33Y 80/00* (2015.01)

(52) U.S. Cl.
CPC ............ *F01D 5/147* (2013.01); *F01D 5/188* (2013.01); *F01D 5/189* (2013.01); *B22F 5/04* (2013.01); *B22F 2003/1056* (2013.01); *B33Y 80/00* (2014.12); *F01D 9/041* (2013.01); *F01D 9/065* (2013.01); *F05D 2220/32* (2013.01); *F05D 2230/22* (2013.01); *F05D 2230/234* (2013.01); *F05D 2230/50* (2013.01); *F05D 2260/20* (2013.01); *F05D 2260/201* (2013.01); *Y02P 10/295* (2015.11)

(58) Field of Classification Search
CPC .... F01D 5/1885; F01D 5/1899; F01D 5/0659; F01D 5/041; B33Y 10/00; B33Y 30/00; B33Y 80/00; F05D 2230/234; F05D 2260/201; F05D 2220/32; F05D 2230/50; F05D 2230/22; F05D 2260/20; Y02P 10/295
See application file for complete search history.

(56) References Cited

U.S. PATENT DOCUMENTS

| | | | | |
|---|---|---|---|---|
| 4,988,844 A | * | 1/1991 | Dietrich | B23K 15/02 219/121.17 |
| 5,203,873 A | * | 4/1993 | Corsmeier | F01D 5/147 416/96 A |
| 5,837,960 A | * | 11/1998 | Lewis | B23K 26/34 219/121.63 |
| 5,876,767 A | | 3/1999 | Mattes et al. | |
| 5,900,170 A | | 5/1999 | Marcin, Jr. et al. | |
| 5,904,890 A | | 5/1999 | Lohner et al. | |
| 5,948,342 A | | 9/1999 | Nakazawa et al. | |
| 5,985,204 A | | 11/1999 | Otsuka et al. | |
| 6,085,122 A | | 7/2000 | Manning | |
| 6,136,257 A | | 10/2000 | Graf et al. | |
| 6,143,378 A | | 11/2000 | Harwell et al. | |
| 6,203,861 B1 | * | 3/2001 | Kar | B22F 3/1055 264/497 |
| 6,215,093 B1 | | 4/2001 | Meiners et al. | |
| 6,269,540 B1 | | 8/2001 | Islam et al. | |
| 6,386,825 B1 | * | 5/2002 | Burdgick | F01D 5/08 415/116 |
| 6,391,251 B1 | | 5/2002 | Keicher et al. | |
| 6,811,744 B2 | * | 11/2004 | Keicher | B05B 7/14 264/112 |
| 7,008,178 B2 | * | 3/2006 | Busch | F01D 5/189 415/115 |
| 7,104,756 B2 | | 9/2006 | Harding et al. | |
| 8,460,755 B2 | | 6/2013 | Rodgers | |
| 9,175,568 B2 | * | 11/2015 | Ryan | B22F 3/1055 |
| 2001/0002287 A1 | | 5/2001 | Kar et al. | |
| 2003/0201087 A1 | | 10/2003 | Devine et al. | |
| 2008/0135718 A1 | | 6/2008 | Lee et al. | |
| 2009/0010765 A1 | | 1/2009 | Propheter-Hinckley et al. | |
| 2010/0232946 A1 | * | 9/2010 | Propheter-Hinckley | F01D 5/189 415/177 |
| 2010/0320701 A1 | | 12/2010 | Groom | |
| 2011/0106290 A1 | * | 5/2011 | Hovel | B22F 3/1055 700/120 |
| 2011/0135952 A1 | * | 6/2011 | Morris | B22F 3/1055 428/548 |
| 2012/0034100 A1 | | 2/2012 | Malecki et al. | |
| 2013/0164960 A1 | | 6/2013 | Swanson et al. | |
| 2013/0280547 A1 | * | 10/2013 | Brandl | B22F 3/1055 428/565 |

FOREIGN PATENT DOCUMENTS

| | | | | |
|---|---|---|---|---|
| CN | 102123850 A | | 7/2011 | |
| CN | 202052935 U | | 11/2011 | |
| EP | 0974735 A2 | | 1/2000 | |
| EP | 1146202 A2 | | 10/2001 | |
| EP | 0964981 B1 | | 12/2002 | |
| EP | 2228517 A2 | | 9/2010 | |
| EP | 2402096 A1 | | 1/2012 | |
| EP | 2471612 A1 | | 7/2012 | |
| GB | 2262314 A | * | 6/1993 | ............ F01D 5/186 |
| JP | 2001295606 A | | 10/2001 | |
| JP | 2003129862 A | | 5/2003 | |
| JP | 2004003470 A | | 1/2004 | |
| JP | 2006052725 A | | 2/2006 | |

OTHER PUBLICATIONS

International Search Report and Written Opinion from PCT Application Serial No. PCT/US2014/023062, dated Aug. 11, 2014, 13 pages.
Extended European Search Report, for European Patent Application No. 14769530.8, dated Oct. 14, 2016, 10 pages.
First Chinese Office Action and Search Report for Chinese Patent Application No. 201480016069.1, dated Jul. 5, 2016, 22 pages.
Chinese Decision of Rejection for Chinese Application No. 201480016069.1, dated Jul. 19, 2017, 21 pages.
Japanese Office Action for Japanese Patent Application No. 2016-501140, dated Oct. 17, 2017, 10 pages.

* cited by examiner

ADDITIVE MANUFACTURING BAFFLES, COVERS, AND DIES

STATEMENT OF GOVERNMENT INTEREST

The U.S. Government has a paid-up license in this invention and the right in limited circumstances to require the patent owner to license others on reasonable terms as provided for by the terms of Contract No. N00019-02-C-3003 awarded by the United States Department of the Navy.

BACKGROUND

The present invention relates to gas turbine engine components, and in particular, to manufacturing processes for gas turbine engine components. Gas turbine engines use a series of compressors and turbines to pass air through the engine to produce rotational shaft power. Each compressor and turbine will have a plurality of blades and a plurality of vanes, where the rotating blades impart or extract rotational velocity from air directed upon them by the stationary vanes. Each blade and vane will have an airfoil that is shaped to direct airflow through the gas turbine engine. Each blade and vane will also have an outer platform and an inner platform that can be attached to other platforms to form a structure between which airfoils can run.

Each blade and vane can have a plurality of cavities in the airfoil, outer platform, and inner platform. The cavities can either run completely through the airfoil from a first end to a second end, or the cavities can extend a defined distance into either the outer platform or the inner platform. During gas turbine engine operation, the blades and vanes are subjected to extremely high temperatures. The high temperatures can exceed the melting temperature of the alloys used to construct the blade and vane. To prevent damage to the blades and vanes due to the extremely high temperatures, the blades and vanes can be cooled using relatively cooler air that is typically siphoned from a compressor. The cooling air can pass into and through the cavities in the airfoil to cool the airfoil internally. The cooling air can also pass into and through the cavities on the outer platform and the inner platform to cooling the outer platform and the inner platform. The cooling air can be directed onto and through the blades and vanes through a variety of processes, including impingement cooling.

A cavity that runs completely through the airfoil can house a baffle that is designed to facilitate impingement cooling, which increases the cooling of the airfoil. A cavity that extends into the outer platform and inner platform a defined distance can house a cover that is also designed to facilitate impingement cooling, which increases the cooling of the outer platform and the inner platform. Designing and manufacturing baffles and covers is a time-consuming process. Baffles and covers are typically manufactured out of a sheet metal and undergo a tooling process to shape them to fit inside the cavities on the blade or vane. The tooling process typically includes a large number of complicated steps. Due to the complicated nature of the tooling process, it typically takes two years of lead time to manufacture new baffle and cover designs.

SUMMARY

According to the present invention, a method includes (a) depositing a layer of a powder material on a work stage, the layer having a thickness, (b) solidifying a portion of the layer based upon data that defines an insert with a body that is shaped to fit into a cavity in a gas turbine engine component, and (c) lowering the work stage by the thickness. Steps (a)-(c) can then be repeated until the insert is complete. The insert can then be removed from the work stage.

A method includes (a) depositing a layer of a powder material on a work stage, the layer having a thickness, (b) solidifying a portion of the layer based upon data that defines a die that can be used during a tooling process, and (c) lowering the work stage by the thickness. Steps (a)-(c) can then be repeated until the die is complete. The die can then be removed from the work stage.

An insert includes a body formed by an additive manufacturing process and shaped to fit in a cavity in a gas turbine engine component, a hole in the body of the insert, and a localized build-up adjacent the hole to promote cooling of the component. The body includes a base portion that is substantially flat, walls extending upwards from the base portion, and flanges, for attachment to the gas turbine engine component, extending outwards from the walls.

A gas turbine engine component with an insert includes a body with an airfoil running between an outer platform and an inner platform, a cavity with an opening on at least one of the outer platform or the inner platform, and an insert, formed by an additive manufacturing process, placed in the cavity with localized build-up in a pre-selected area to promote cooling of the component.

DETAILED DESCRIPTION

In general, the present application relates to manufacturing processes for inserts for gas turbine engine components. Inserts can be placed in cavities in blades and vanes to direct cooling airflow through the blades and vanes to cool the blades and vanes. Inserts have typically been made with complicated tooling manufacturing processes. Development of the tooling is extremely time intensive. The present application discloses using an additive manufacturing process to manufacture inserts for blades and vanes. Using an additive manufacturing process to manufacture inserts can reduce the lead time required to manufacture the initial parts from two years to a few days. It also allows for greater flexibility in the design of inserts, as different insert designs can be more easily prototyped and tested.

Figure 1:
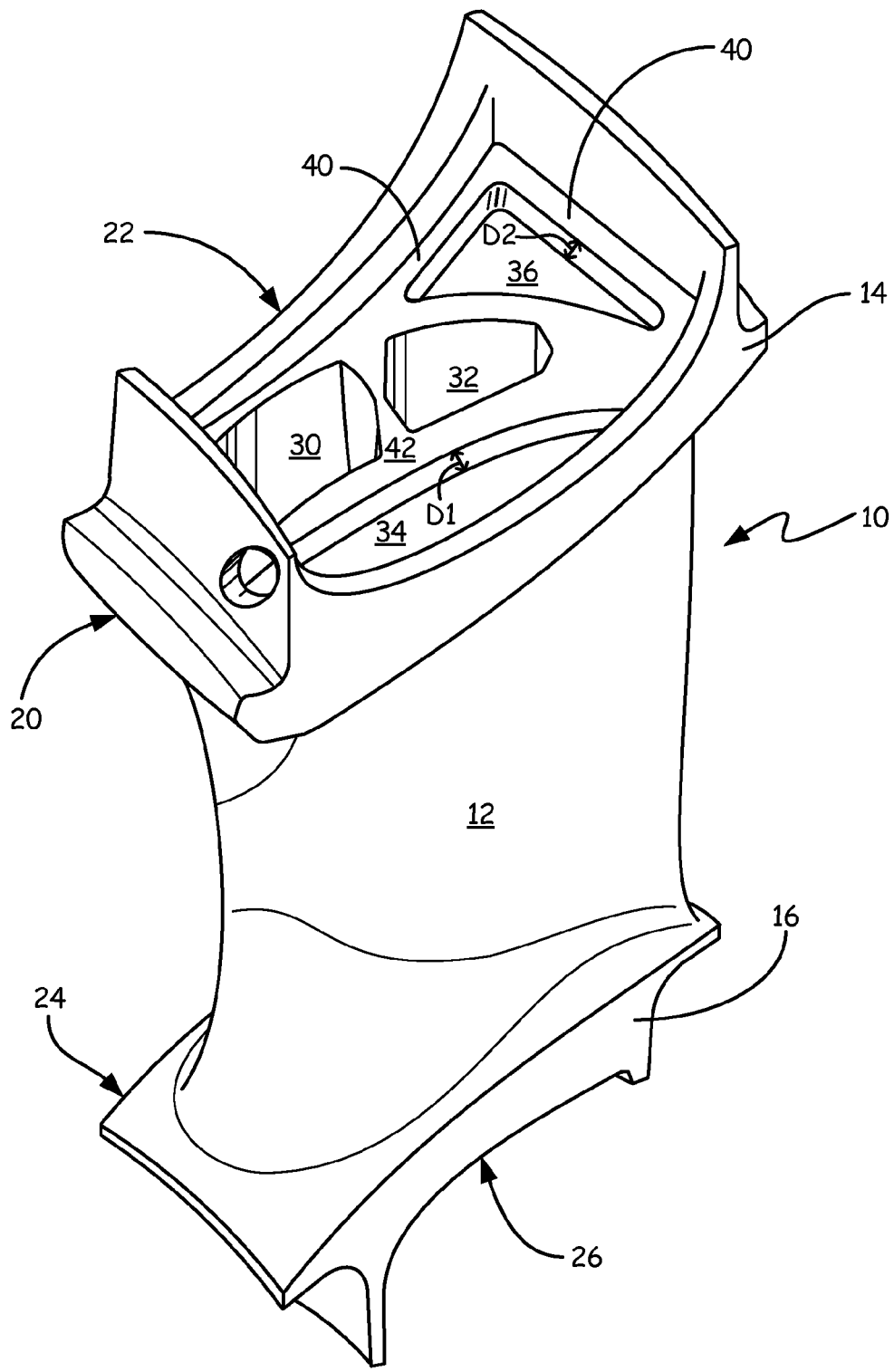
FIG. 1 is a perspective view of a vane.

FIG. 1 is a perspective view of vane 10. Vane 10 includes airfoil 12, outer platform 14, inner platform 16, cavity 30, cavity 32, cavity 34, cavity 36, ledges 40, and bosses 42. Outer platform 14 includes gas path side 20 and non-gas path side 22. Inner platform 16 includes gas path side 24 and non-gas path side 26.

Vane 10 is a gas turbine engine component that can be placed in turbine sections or compressor sections in a gas turbine engine. Vane 10 is shown in FIG. 1, but vane 10 could be a blade in alternate embodiments. Vane 10 is placed in a turbine section of a gas turbine engine in the embodiment shown, but in alternate embodiments vane 10 can be placed in a compressor section of a gas turbine engine. Vane 10 includes airfoil 12 running between outer platform 14 and inner platform 16. Airfoil 12 is shaped to direct airflow through a gas turbine engine and is placed in a flow path of the turbine section.

Outer platform 14 includes gas path side 20 and non-gas path side 22. Gas path side 20 faces the flow path through which airfoil 12 runs. Non-gas path side 22 is located out of the flow path. Inner platform 14 includes gas path side 24 and non-gas path side 26. Gas path side 24 faces the flow path through which airfoil 12 runs. Non-gas path side 26 is located out of the flow path. Outer platform 14 and inner platform 16 are attached to other platforms in the gas turbine engine to form structures between which airfoil 12 is supported. The structures formed by outer platform 14 and inner platform 16 create boundaries to keep air flowing through the flow path.

Cavities 30, 32, 34, and 36 are located in vane 10 with an opening on either or both of outer platform 14 and/or inner platform 16. Cavity 30 runs through airfoil 12 with an opening on outer platform 14 and an opening on inner platform 16. Cavity 32 runs through airfoil 12 with an opening on outer platform 14 and an opening on inner platform 16. Cavity 34 runs into outer platform 14 a defined distance D1 and has an opening on outer platform 14. Cavity 36 runs into outer platform 14 a defined distance D2 and has an opening on outer platform 14.

Cavities 30, 32, 34, and 36 run through vane 10 to direct cooling airflow into and through airfoil 12, outer platform 14, and inner platform 16. Cooling airflow is directed through cavities 30 and 32 to cool airfoil 12 from the inside. Cooling airflow is directed into cavities 34 and 36 to cool outer platform 14. Cavities can also be located on inner platform 16 to cool inner platform 16.

Ledges 40 define an outer frame of outer platform 14 with cavities 30, 32, 34, and 36 located inside of ledges 40. Bosses 42 run inside of ledges 40 and between cavities 30, 32, 34, and 36. Ledges 40 and bosses 42 provide structure for cavities 30, 32, 34, and 36 and help to define the shape of cavities 30, 32, 34, and 36. Ledges and bosses can also be located on inner platform 16.

Cavities 30, 32, 34, and 36 are located in vane 10 to cool airfoil 12, outer platform 14, and inner platform 16. Vane 10 is subject to extremely high temperatures that can exceed the melting temperature of the material that vane 10 is made out of. To prevent the high temperatures from damaging vane 10, cooling airflow is introduced into vane 10 through cavities 30, 32, 34, and 36. The cooling airflow cools vane 10 by running past the surfaces of vane 10. It is desirable to maximize the cooling effects of the cooling airflow that runs through cavities 30, 32, 34, and 36. This can be done by inserting a plurality of baffles and covers into cavities 30, 32, 34, and 36, as will be seen and discussed in reference to FIG. 2.

Figure 2:
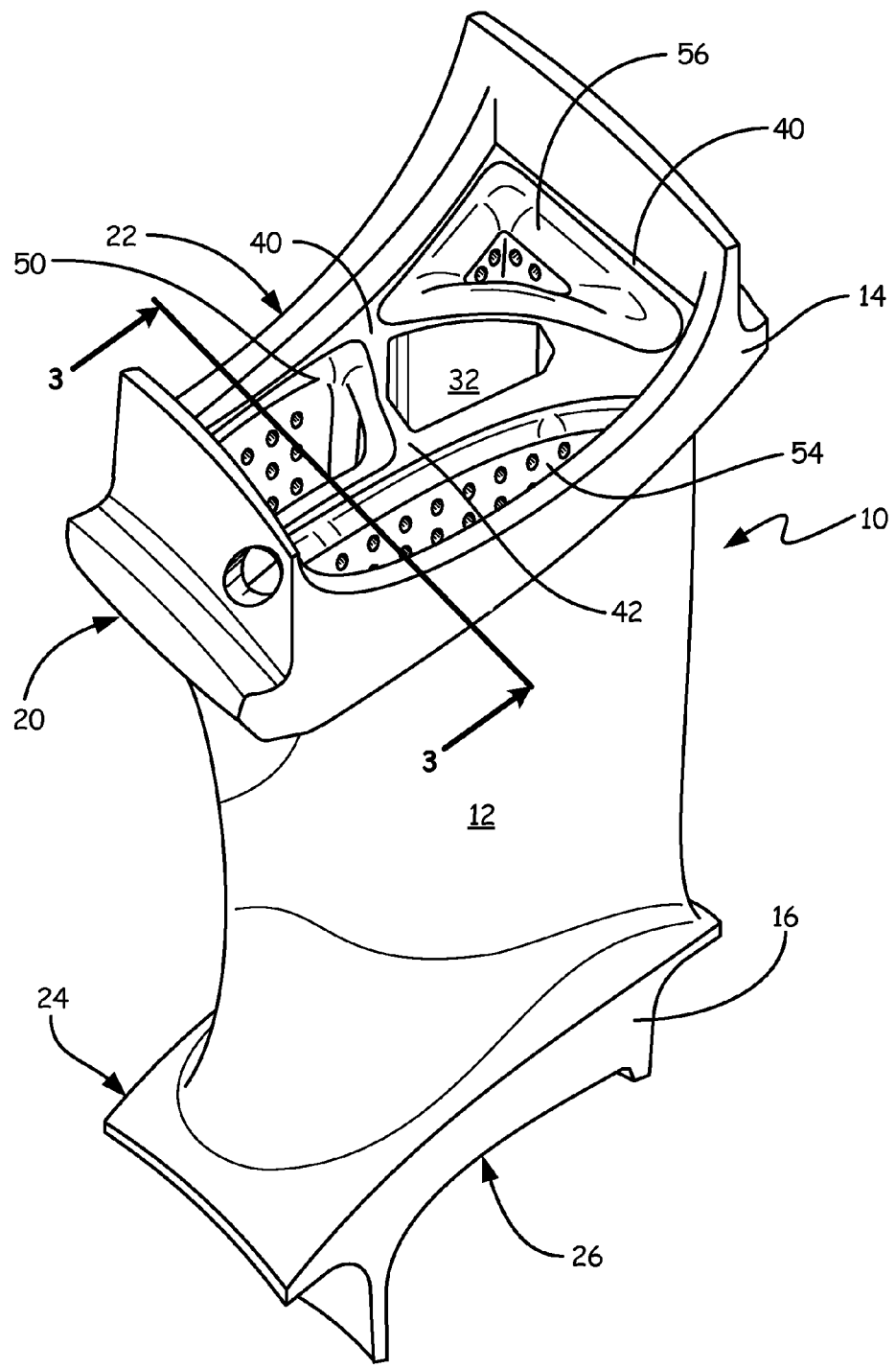
FIG. 2 is a perspective view of the vane with baffles and covers.

FIG. 2 is a perspective view of vane 10 with baffle 50, cover 54, and cover 56. Vane 10 includes airfoil 12, outer platform 14, inner platform 16, cavity 32, ledges 40, bosses 42, baffle 50, cover 54, and cover 56. Outer platform 14 includes gas path side 20 and non-gas path side 22. Inner platform 16 includes gas path side 24 and non-gas path side 26.

Vane 10 includes airfoil 12 that runs between outer platform 14 and inner platform 16. Outer platform 14 and inner platform 16 can be attached to other platforms to form structures that support airfoil 12 between them. Outer platform 14 has gas path side 20 and non-gas path side 22. Inner platform 16 has gas path side 24 and non-gas path side 26. Gas path side 20, gas path side 24, and airfoil 12 are all located in a flow path in a gas turbine engine. Non-gas path side 22 and non-gas path side 26 run outside of the flow path.

Cavities 30, 32, 34, and 36 are located in vane 10, as seen in FIG. 1. As seen in FIG. 2, baffle 50 is located in cavity 30, cover 54 is located in cavity 34, and cover 56 is located in cavity 36. Baffle 50, cover 54, and cover 56 are all inserts that can be placed in vane 10 to facilitate impingement cooling. In the embodiment shown, cavity 32 is left open, but a baffle can be placed in cavity 32 in alternate embodiments. Baffle 50, cover 54, and cover 56 all have flanges that rest on ledges 40 and bosses 42. Ledges 40 define an outer frame of outer platform 14 with cavities 30, 32, 34, and 36 located inside of ledges 40. Bosses 42 run inside of ledges 40 and between cavities 30, 32, 34, and 36. Ledges 40 and bosses 42 support baffle 50, cover 54, and cover 56 and hold them in cavities 30, 34, and 36, respectively.

Baffle 50, cover 54, and cover 56 are made with a nickel alloy in the embodiment shown, but any suitable material that is capable of withstanding high temperatures can be used in alternate embodiments. In the embodiment shown, baffle 50, cover 54, and cover 56 all have holes to facilitate impingement cooling of vane 10 (including airfoil 12, outer platform 14, and inner platform 16). Baffle 50 allows cooling air flow to flow through the holes and onto interior walls of airfoil 12. Cover 54 and cover 56 allow cooling air flow to flow through the holes and onto a surface of outer platform 14. Covers can also be placed in cavities in inner platform 16 to cool a surface of inner platform 16. The holes are located on walls of baffle 50 and on base portions of cover 54 and cover 56.

Baffle 50, cover 54, and cover 56 are all constructed with an additive manufacturing process in the embodiment shown. As discussed below with reference to FIG. 4, additive manufacturing processes build parts in layers by solidifying one layer of an object at a time and building upon itself. Using an additive manufacturing process to manufacture baffle 50, cover 54, and cover 56 is advantageous, as it reduces the time required to manufacture these parts. Typically, baffle 50, cover 54, and cover 56 are manufactured with a complicated tooling process that can take up to two years to complete. This limits the flexibility in the design of baffle 50, cover 54, and cover 56, as the design needs to be finalized two years before the parts are to be tested or commercially sold. This can also limit the design of the interior structure of vane 10, as the structure of cavities 30, 32, 34, and 36 needs to be finalized two years before testing or selling vane 10 to ensure that baffle 50 fits in cavity 30, that cover 54 fits in cavity 34, and that cover 56 fits in cavity 36. Limiting the design of baffle 50, cover 54, cover 56, and the interior of vane 10 can limit the function of vane 10.

Manufacturing baffle 50, cover 54, and cover 56 with an additive manufacturing process reduces the time required to produce the parts from two years to a few days. This greatly improves the flexibility in the design of baffle 50, cover 54, cover 56, and the interior of vane 10, as it allows different designs to be quickly prototyped and tested for functionality. It also greatly reduces the lead time that is typically required to receive these parts with typical manufacturing processes, such as tooling processes. Even if commercial embodiments of baffle 50, cover 54, and cover 56 are manufactured using a tooling process, manufacturing test parts with an additive manufacturing process is advantageous, as it gives the tooling manufacturers time to set up and design the process that is required to produce the parts.

Using additive manufacturing processes to manufacture baffle 50, cover 54, and cover 56 can also allow for more effective cooling, by allowing localized build-up to be manufactured in pre-selected areas. When baffle 50, cover 54, and cover 56 are manufactured with tooling processes, they are manufactured out of a sheet metal. The holes that are located on baffle 50, cover 54, and cover 56 are typically tooled into the sheet metal near the end of the process. When using an additive manufacturing process to manufacture baffle 50, cover 54, and cover 56, the holes can be formed in baffle 50, cover 54, and cover 56 as the part is being additively manufactured. This allows for the design of baffle 50, cover 54, and cover 56 with a localized build-up in an area adjacent to the holes. The localized build-up can, for example, include an increased thickness in the walls of baffle 50, cover 54, and cover 56 in an area immediately surrounding the holes. Increasing the thickness in an area immediately surrounding the holes is advantageous, as impingement cooling of airfoil 12 can be more precisely controlled. The holes can also be tooled into the walls and base portions of baffle 50, cover 54, and cover 56 after the parts are additively manufactured. In this case, the walls and base portions of baffle 50, cover 54, and cover 56 can be manufactured with an increased thickness in an area where a hole will be tooled. Increasing the thickness in an area immediately surrounding a hole when baffle 50, cover 54, and cover 56 are manufactured with a tooling process requires a complicated process, if it is even possible at all, as the parts are manufactured out of a flat sheet metal.

Further, when using additive manufacturing processes to manufacture baffle 50, cover 54, and cover 56, localized protrusions and divots can be built into the design of baffle 50, cover 54, and cover 56. Localized protrusions and divots can increase the cooling effects of baffle 50, cover 54, and cover 56 by directing the cooling airflow across and through baffle 50, cover 54, and cover 56. Using an additive manufacturing process to manufacture baffle 50, cover 54, and cover 56 allows for greater design flexibility in the design of the localized protrusions and divots, as the localized protrusions and divots no longer need to be tooled into baffle 50, cover 54, and cover 56.

Another advantage of using an additive manufacturing process to manufacture baffle 50, cover 54, and cover 56 is the same process can be used to manufacture dies for baffle 50, cover 54, and cover 56. Dies are typically used during the tooling process to shape a body of baffle 50, cover 54, and cover 56 after the body has been cut from a piece of flat sheet metal. Additionally, dies can be used to give baffle 50, cover 54, and cover 56 detailed features, such as standoffs and divots. Using an additive manufacturing process to create dies for use during tooling process is advantageous, as it allows a user to quickly manufacture a die that can be used to manufacture baffle 50, cover 54, and cover 56. This can significantly reduce the time needed to prototype and test the functionality of baffle 50, cover 54, and cover 56, which allows for greater flexibility in the design of baffle 50, cover 54, and cover 56. Further, using an additive manufacturing process to manufacture dies is advantageous because it allows for greater flexibility in the design of the dies themselves. Even if baffle 50, cover 54, and cover 56 are manufactured with an additive manufacturing process, changes could be made to the parts with die-shaping processes to test different designs. Using additive manufacturing processes to manufacture dies will greatly reduce the time required to adjust the design of baffle 50, cover 54, and cover 56 during testing procedures.

Figure 3:
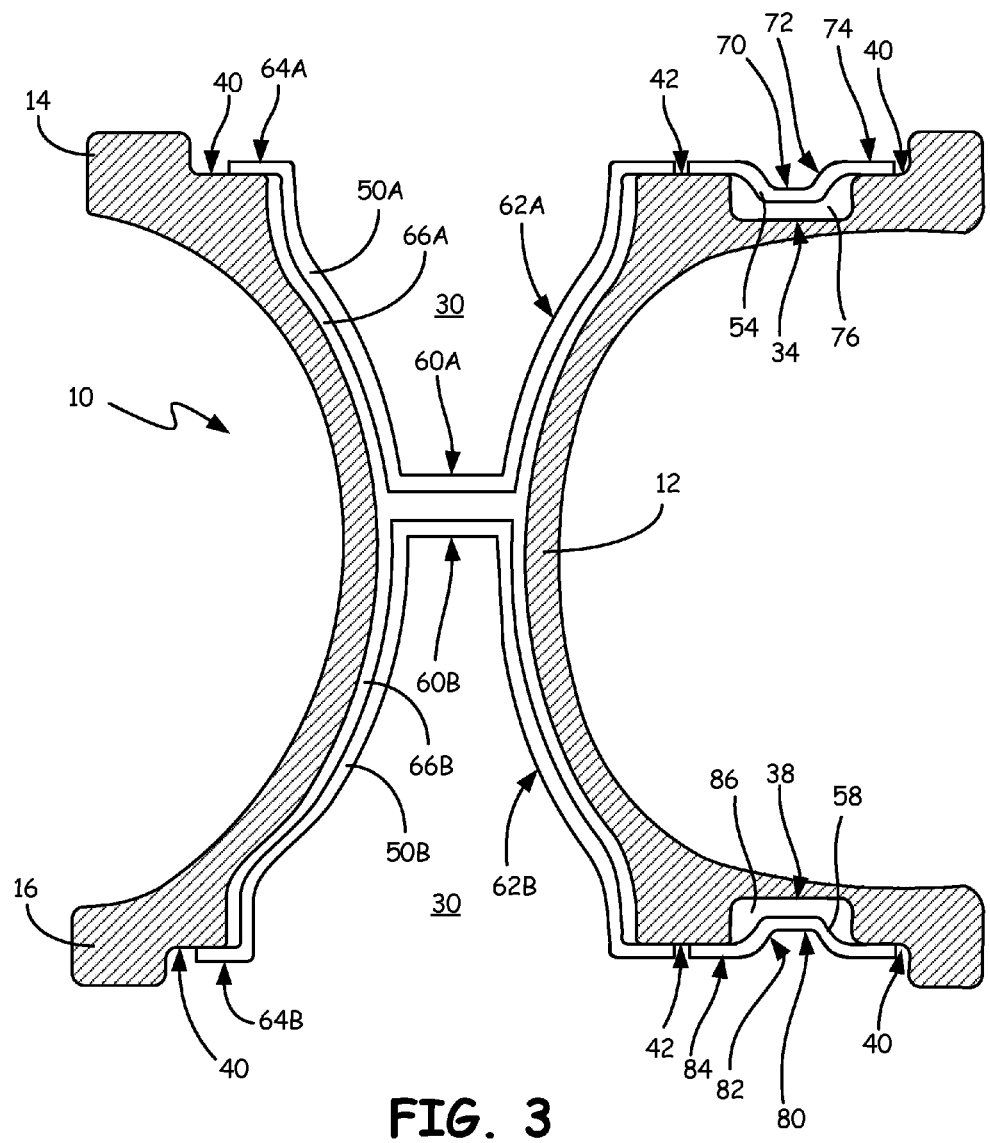
FIG. 3 is a side cross sectional view of the vane, taken along line 3-3 of FIG. 2.

FIG. 3 is a side cross sectional view of vane 10, taken along line 3-3 of FIG. 2. Vane 10 includes airfoil 12, outer platform 14, inner platform 16, cavity 30, cavity 34, cavity 38, baffles 50A and 50B, cover 54, cover 58, ledges 40, and bosses 42. Baffle 50A includes base portion 60A, walls 62A, and flanges 64A. Baffle 50B includes base portion 60B, walls 62A, and flanges 64A. Cover 54 includes base portion 70, walls 72, and flanges 74. Cover 58 includes base portion 80, walls 82, and flanges 84. Also shown in FIG. 3 are gaps 66A, 66B, 76, and 86.

Vane 10 includes airfoil 12 that runs between outer platform 14 and inner platform 16. Outer platform 14 and inner platform 16 can be attached to other platforms to form structures that support airfoil 12 between them. Ledges 40 extend around a perimeter of outer platform 14 and inner platform 16. Bosses 42 are located in an inside portion of outer platform 14 and inner platform 16. Bosses 42 run between cavity 30 and cavity 34 on outer platform 14 and between cavity 30 and cavity 38 on inner platform 16. Cavity 30 runs through airfoil 12 with a first opening on outer platform 14 and a second opening on inner platform 16. Cavity 34 extends a defined distance into outer platform 14 with an opening on outer platform 14. Cavity 38 extends a defined distance into inner platform 16 with an opening on inner platform 16.

Baffles 50A and 50B are located in cavity 30. In the embodiment shown, baffles 50A and 50B are two separate pieces. In an alternate embodiment, baffles 50A and 50B can be one piece that runs all the way through cavity 30. Cover 54 is located in cavity 34 and cover 58 is located in cavity 38. Baffles 50A and 50B are placed in cavity 30 to facilitate impingement cooling through airfoil 12, cover 54 is placed in cavity 34 to facilitate impingement cooling of outer platform 14, and cover 58 is placed in cavity 38 to facilitate impingement cooling of inner platform 16.

Baffle 50A includes base portion 60A, walls 62A, and flanges 64A. Base portion 60A is a substantially flat portion in the embodiment shown and provides a base from which baffle 50A can extend. Walls 62A extend upwards from base portion 60A and are shaped to mimic the shape of cavity 30. Walls 62A surround base portion 60A and form a continuous structure. Flanges 64A extend outwards from walls 62A at a top end of baffle 50A. Baffle 50A can be inserted into cavity 30 until flanges 64A rest on ledges 40 and bosses 42. Holes are located on walls 62A of baffle 50A (see FIG. 2). Gap 66A exists between walls 62A and cavity 30. Gap 66A allows cooling air to flow through the holes in walls 62A to cool the interior walls of cavity 30 and airfoil 12.

Baffle 50B includes base portion 60B, walls 62B, and flanges 64B. Base portion 60B is a substantially flat portion in the embodiment shown and provides a base from which baffle 50B can extend. Walls 62B extend upwards from base portion 60B and are shaped to mimic the shape of cavity 30. Walls 62B surround base portion 60B and form a continuous structure. Flanges 64B extend outwards from walls 62B at a top end of baffle 50B. Baffle 50B can be inserted into cavity 30 until flanges 64B rest on ledges 40 and bosses 42. Holes are located on walls 62B of baffle 50B (see FIG. 2). Gap 66B exists between walls 62B and cavity 30. Gap 66B allows cooling air to flow through the holes in walls 62B to cool the interior walls of cavity 30 and airfoil 12.

Cover 54 includes base portion 70, walls 72, and flanges 74. Base portion 70 is a substantially flat portion in the embodiment shown and provides a base from which cover 54 can extend. Walls 72 extend upwards from base portion 70 and are shaped to mimic the shape of cavity 34. Walls 72 surround base portion 70 and form a continuous structure. Flanges 74 extend outwards from walls 72 at a top end of cover 54. Cover 54 can be inserted into cavity 34 until flanges 74 rest on ledges 40 and bosses 42. Holes are located on base portion 70 of cover 54 (see FIG. 2). Gap 76 exists between base portion 70 and cavity 34 and between walls 72 and cavity 34. Gap 76 allows cooling air to flow through the holes in base portion 70 to cool outer platform 14.

Cover 58 includes base portion 80, walls 82, and flanges 84. Base portion 80 is a substantially flat portion in the embodiment shown and provides a base from which cover 58 can extend. Walls 82 extend upwards from base portion 80 and are shaped to mimic the shape of cavity 38. Walls 82 surround base portion 80 and form a continuous structure. Flanges 84 extend outwards from walls 82 at a top end of cover 58. Cover 58 can be inserted into cavity 38 until flanges 84 rest on ledges 40 and bosses 42. Holes are located on base portion 80 of cover 58 (not shown). Gap 86 exists between base portion 80 and cavity 38 and between walls 82 and cavity 38. Gap 86 allows cooling air to flow through the holes in base portion 80 to cool inner platform 16.

Baffles 50A and 50B, cover 54, and cover 58 are additively manufactured in the embodiment shown. Manufacturing baffles 50A and 50B, cover 54, and cover 58 with an additive manufacturing process is advantageous, as it reduces the time required to manufacture the parts from a typical two years to a few days. This reduction in time required to manufacture the parts allows for quick production of test parts that can be used to prototype a vane and a gas turbine engine system. This allows for greater flexibility in the design of baffles 50A and 50B, cover 54, and cover 58, which ultimately increases the effectiveness of these parts and increases cooling of vane 10.

Figure 4:
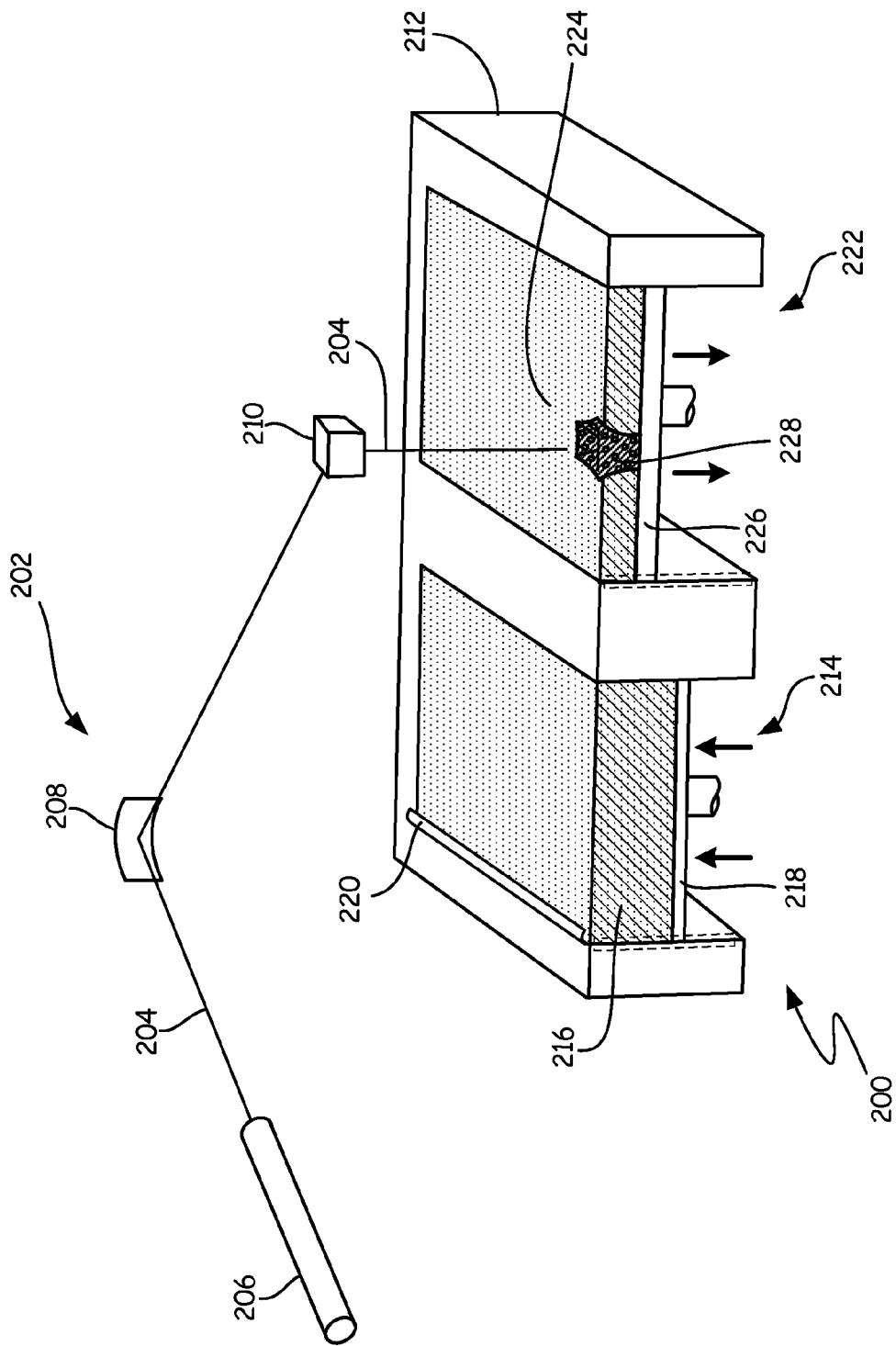
FIG. 4 is a cross-sectional perspective view of an additive manufacturing system.

FIG. 4 is a cross-sectional perspective view of additive manufacturing system 200. In particular, FIG. 4 shows a direct metal laser sintering apparatus. Additive manufacturing system 200 is one of a variety of additive manufacturing devices that are capable of building baffles 50A and 50B, cover 54, cover 56, and cover 58. Additive manufacturing system 200 builds parts in a layer-by-layer fashion, such that finished parts made by additive manufacturing system 200 are monolithic. Additive manufacturing system 200 may be used to build a variety of components as a single solid piece which would require construction in multiple parts using traditional manufacturing processes, or which may have discontinuities or sharp edges due to welding of joints or other traditional manufacturing processes.

Additive manufacturing system 200 includes optical system 202. Optical system 202 includes radiation beam 204, radiation source 206, minor 208, and movable optical head 210. Radiation beam 204 is a laser beam. Radiation beam 204 emanates from radiation source 206, and travels towards minor 208. Minor 208 reflects radiation beam 204 towards movable optical head 210. Movable optical head 210 reflects radiation beam 204 towards a desired target.

Additive manufacturing system 200 also includes frame 212. Frame 212 provides physical support for other components that make up additive manufacturing system 200. Frame 212 may be, for example, a solid metal structure defining interior voids to contain other components of additive manufacturing system 200.

Additive manufacturing system 200 further includes material supply system 214. Material supply system 214 is a system for delivering material used in additive manufacturing. As shown in FIG. 4, material supply system 214 includes sinterable material 216 and supply platform 218. Sinterable material 216 may be, for example, a powdered metal that is at least partially sinterable to form a solid part. Supply platform 218 is a platform that may be raised or lowered with respect to frame 212 in order to facilitate the supply of sinterable material 216.

Additive manufacturing system 200 also includes spreader 220. Spreader 220 is used to transfer sinterable material 216 from supply system 214 to a desired location for additive manufacturing. Spreader 220 can transfer sinterable material 216 to a desired location by rolling sinterable material 216 across a desired location.

Additive manufacturing system 200 also includes build station 222. Build station 222 includes working layer 224 and build platform 226. Working layer 224 consists of a surface layer of sinterable material that is positioned to be sintered by radiation beam 204. Build platform 226 is a platform that is movable with respect to frame 212 in order to facilitate layer-by-layer construction of components by additive manufacturing system 200.

Object 228 is a partially built baffle in FIG. 4, as it is being made by additive manufacturing system 200. Object 228 is built by additive manufacturing system 200 as a single component. In alternate embodiments, object 228 can be any airfoil insert, including a cover, or a die for forming an airfoil insert.

Radiation beam 204 is directed towards working layer 224 by optical system 202. Radiation source 206 generates a radiation beam, which is deflected by minor 208 and movable optical head 210 to selectively heat portions of working layer 224. By moving minor 208 and movable optical head 210, a desired pattern of sintered material may be generated in working layer 224. Typically, a slice or layer of a three-dimensional part is made in working layer 224.

Once the layer is complete, material supply system 214 provides additional sinterable material 216 to build station 222. In particular, sinterable material 216 is positioned above a surface of frame 212 when supply platform 218 is raised. Spreader 220 transfers sinterable material 216 across the surface of frame 212 towards build station 222. Meanwhile, build station 222 prepares to receive sinterable material 216 by lowering build platform 226 by a distance proportional to the amount supply platform 218 was raised. Sinterable material 216 displaces the gap left when build platform 226 was lowered, which results in a new working layer 224 of unsintered sinterable material 216.

By repeating this process multiple times, monolithic objects 228 may be generated in a layer-by-layer manner. This process is only one potential additive manufacturing method for manufacturing baffles 50A and 50B, cover 54, cover 56, and cover 58. In other embodiments, there may be powder or liquid sinterable material 216. Additive manufacturing apparatus 200 may employ stereolithography, electron beam melting, or laser powder deposition, among other forms of additive manufacturing that are known in the field.

Possible Embodiments

The following are non-exclusive descriptions of possible embodiments of the present invention.

A method includes (a) depositing a layer of a powder material on a work stage, the layer having a thickness, (b) solidifying a portion of the layer based upon data that defines an insert with a body that is shaped to fit into a cavity in a gas turbine engine component, and (c) lowering the work stage by the thickness. Steps (a)-(c) can then be repeated until the insert is complete. The insert can then be removed from the work stage.

The method of the preceding paragraph can optionally include, additionally and/or alternatively, any one or more of the following features, configurations, and/or additional components.

Holes can be created in the body of the insert while solidifying portions of the layer of the powder material.

A thickened wall portion can surround the holes in the body of the insert.

Holes can be tooled into the body of the insert after the insert has been removed from the work stage.

A thickened wall portion can surround the holes in the body of the insert.

Localized protrusions can be created in the body of the insert while solidifying portions of the layer of powder material.

Localized divots can be created in the body of the insert while solidifying portions of the layer of powder material.

The powder material can be solidified using a laser.

The powder material can be a nickel alloy.

The powder material can be deposited on the work stage by rolling it onto the work stage.

A method includes (a) depositing a layer of a powder material on a work stage, the layer having a thickness, (b) solidifying a portion of the layer based upon data that defines a die that can be used during a tooling process, and (c) lowering the work stage by the thickness. Steps (a)-(c) can then be repeated until the die is complete. The die can then be removed from the work stage.

The method of the preceding paragraph can optionally include, additionally and/or alternatively, any one or more of the following features, configurations, and/or additional components.

The die can be used to manufacture an insert that is shaped to fit in a cavity in a gas turbine engine component.

The powder material can be solidified using a laser.

The powder material can be a nickel alloy.

The powder material can be deposited on the work stage by rolling it onto the work stage.

An insert includes a body formed by an additive manufacturing process and shaped to fit in a cavity in a gas turbine engine component, a hole in the body of the insert, and a localized build-up adjacent the hole to promote cooling of the component. The body includes a base portion that is substantially flat, walls extending upwards from the base portion, and flanges, for attachment to the gas turbine engine components, extending outwards from the walls.

The insert of the preceding paragraph can optionally include, additionally and/or alternatively, any one or more of the following features, configurations, and/or additional components.

The insert can be a baffle.

The insert can include a plurality of holes in the walls.

The insert can include a thickened wall portion surrounding the plurality of holes.

The insert can be a cover.

The insert can include a plurality of holes in the base portion.

The insert can include a thickened wall portion surrounding the plurality of holes.

The insert can include localized protrusions in the body of the insert.

The insert can include localized divots in the body of the insert.

A gas turbine engine component with an insert includes a body with an airfoil running between an outer platform and an inner platform, a cavity with an opening on at least one of the outer platform or the inner platform, and an insert, formed by an additive manufacturing process, placed in the cavity with localized build-up in a pre-selected area to promote cooling of the component.

The component of the preceding paragraph can optionally include, additionally and/or alternatively, any one or more of the following features, configurations, and/or additional components.

The cavity can run through the airfoil and the insert can be a baffle that is placed in the cavity.

The cavity can extend a defined distance into at least one of the outer platform or the inner platform and the insert can be a cover that is placed in the cavity.

Although the present invention has been described with reference to preferred embodiments, workers skilled in the art will recognize that changes may be made in form and detail without departing from the spirit and scope of the invention.

The invention claimed is:

1. A method comprising:
   (a) depositing a layer of a powder material on a work stage, the layer having a thickness;
   (b) solidifying a portion of the layer based upon data that defines an insert with a body that is shaped to fit into a cavity in a gas turbine engine airfoil, and which includes holes in the body of the insert and a thickened wall portion surrounding the holes in the body of the insert;
   (c) lowering the work stage by the thickness;
   (d) repeating steps (a)-(c) until the insert is complete; and
   (e) removing the insert from the work stage.

2. The method of claim 1, wherein the holes are created in the body of the insert while solidifying portions of the layer of the powder material.

3. The method of claim 1, wherein localized protrusions are created in the body of the insert while solidifying portions of the layer of powder material.

4. The method of claim 1, wherein localized divots are created in the body of the insert while solidifying portions of the layer of powder material.

5. The method of claim 1, wherein the powder material is solidified using a laser.

6. The method of claim 1, wherein the powder material is a nickel alloy.

7. The method of claim 1, wherein the powder material is deposited on the work stage by rolling it onto the work stage.

8. A method comprising:
   (a) depositing a layer of a powder material on a work stage, the layer having a thickness;
   (b) solidifying a portion of the layer based upon data that defines a die that can be used during a tooling process, and which includes holes in the die and a thickened wall portion surrounding the holes in the die;
   (c) lowering the work stage by the thickness;
   (d) repeating steps (a)-(c) until the die is complete; and
   (g) removing the die from the work stage.

9. The method of claim 8, wherein the die can be used to manufacture an insert that is shaped to fit in a cavity in a gas turbine engine component.

10. The method of claim 8, wherein the powder material is solidified using a laser.

11. The method of claim 8, wherein the powder material is a nickel alloy.

12. The method of claim 8, wherein the powder material is deposited on the work stage by rolling it onto the work stage.

* * * * *